United States Patent [19]
D'Olier

[11] 3,821,063

[45] June 28, 1974

[54] INSULATING MATERIAL

[75] Inventor: George D'Olier, Devon, Conn.

[73] Assignee: Raybestos-Manhattan, Inc., Stratford, Conn.

[22] Filed: Apr. 28, 1972

[21] Appl. No.: 247,445

[52] U.S. Cl. ............... 161/60, 23/288 F, 156/306, 161/70, 161/170, 161/205, 260/41.5 R
[51] Int. Cl........ B32b 5/12, B32b 13/12, B01j 9/00
[58] Field of Search ............... 161/60, 70, 170, 205

[56] References Cited
UNITED STATES PATENTS

| | | | |
|---|---|---|---|
| 2,534,814 | 12/1950 | D'Olier | 260/41.5 |
| 2,626,213 | 1/1953 | Novak | 92/3 |
| 2,668,142 | 2/1954 | Strecker | 196/50 |
| 3,449,202 | 6/1969 | Bowen | 161/170 |
| 3,509,017 | 4/1970 | Accountius | 161/206 |
| 3,597,514 | 8/1971 | Jager | 264/43 |
| 3,694,304 | 9/1972 | Palumbo | 161/68 |
| 3,703,396 | 11/1972 | Lamanche et al. | 117/21 |

*Primary Examiner*—George F. Lesmes
*Assistant Examiner*—William R. Dixon, Jr.

[57] ABSTRACT

An asbestos sheet material, particularly suitable for use as thermal insulation in an emission control device for internal combustion engines, consisting of chrysotile asbestos fibers and elastomeric binder comprising a high molecular weight copolymer of butadiene, the major portion of the asbestos fibers in the sheet being oriented in substantially parallel relation with respect to each other. Prior to use, the sheet is heat treated at a temperature of 525° to 575°F. for a period of time to cause a weight reduction of 8–10 percent.

6 Claims, 4 Drawing Figures

PATENTED JUN 28 1974 3,821,063

INSULATING MATERIAL

BACKGROUND OF THE INVENTION

One of the main sources of atmospheric pollution is exhaust emissions from internal combustion engines. In view thereof both federal and state governments have enacted legislation establishing emission standards with the view to improving mans' environment. In order to meet such standards, the automotive industry is engaged in extensive research for ways to reduce the amount of pollutants, such as unburned hydrocarbons, carbon monoxide, and nitrogen and sulfur oxides, in the exhaust emissions from internal combustion engines. Proposals to reduce pollution include improved combustion of fuel, recycle of a portion of exhaust gases, and treatment of exhaust gases to convert pollutants into non-polluting forms, e.g. carbon dioxide and water vapor.

With respect to the treatment of exhaust emissions from internal combustion engines, it has been proposed to pass the exhaust gases through a thermal reactor designed to maintain the gases at a relatively high temperature on the order of 1,600°–2,000°F. An oxidizing gas, such as air, is also introduced to the reactor, whereby unburned hydrocarbons and carbon monoxide are converted into such non-polluting substances as carbon dioxide and water vapor. The reactor can also contain a catalyst such as platinum, which promotes such reactions.

Because certain equipment, e.g., rubber hose, plastic fittings, etc., located in the engine compartment of a motor vehicle is incapable of withstanding very high temperatures, the compartment temperature must not be permitted to exceed a given maximum, otherwise such equipment would be degraded and ultimately destroyed. Thus, the exhaust manifold and other engine parts are so designed that the exterior surfaces thereof do not exceed about 900°F.

As noted above, in order to obtain the necessary conversion of pollutants to non-polluting forms, reaction temperatures of 1,600°F. or greater are required. Thus, thermally insulating the reactor from the engine compartment is required. For such purpose it has been proposed to use a thermal insulating material consisting of a sheet of asbestos fibers bonded together by an inorganic binder, such as sodium silicate. Unfortunately, because of the vibratory forces which are present during operation of a motor vehicle, such insulation, which is relatively brittle, rapidly disintegrates and loses its insulating properties.

U.S. Pat. No. 2,534,814 discloses a compressed sheet material consisting of asbestos fibers and vulcanized rubber (natural or synethtic). Although such sheet has some degree of resiliency, as well as thermal insulating properties; nevertheless, upon being heated rapidly to temperatures above 500°F., the sheet badly blisters and loses both insulating properties and strength in the blistered areas. It is, therefore, unsatisfactory as an insulating material for thermal reactors for internal combustion engines.

OBJECTS OF THE INVENTION

It is a primary object of the present invention to provide a novel thermal insulating material comprising chrysotile asbestos fibers and elastomeric binder.

Another object of this invention is to provide a thermal insulating material which is resilient and which retains its thermal insulating properties and a significant degree of resiliency when heated to temperatures on the order of 700° to 1,200°F.

Still another object of the present invention is a method for producing an improved thermal insulating material comprising chrysotile asbestos fibers and elastomeric binder, which method involves a novel heat treatment.

Yet another object of this invention is an improved thermal reactor for treating exhaust emissions from internal combustion engines to reduce the quantity of pollutants introduced to the atmosphere.

These and other objects of this invention will be readily understood by reference to the specification, appended claims and drawings, in which:

Figure 1:
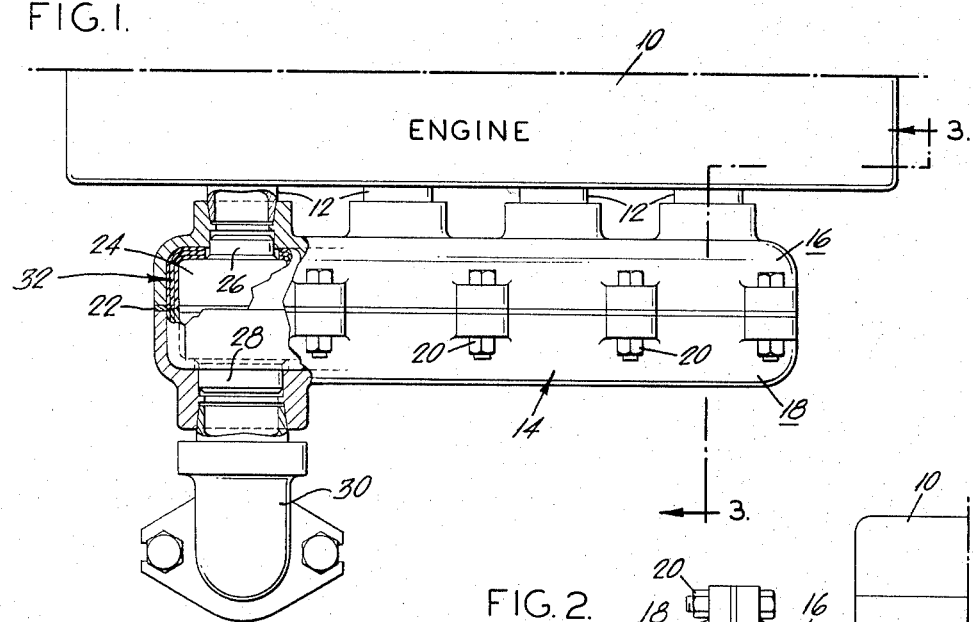
FIG. 1 is a plan view showing schematically an internal combustion engine having attached thereto an emission control device according to this invention, with parts broken away.

According to this invention, there is provided a novel method of making a heat insulating material which comprises forming a sheet comprising chrysotile asbestos fibers and an elastomeric binder comprising a high molecular weight copolymer of butadiene, the major portion of the asbestos fibers being oriented in a generally parallel relation with respect to each other within said sheet, and heat treating said sheet at a temperature of from about 525° to about 575°F. for a period of time to cause a weight reduction in said sheet of from about 8 to about 10 percent.

Preferably, the sheet, prior to the stated heat treatment, is produced according to the method of U.S. Pat. No. 2,534,814, discussed in greater detail hereinafter.

This invention also contemplates a novel emission control device comprising a reaction chamber, means surrounding and supporting the reaction chamber, and heat insulating means comprising a plurality of superimposed layers of the novel asbestos sheet material of this invention being located between the reaction chamber and supporting means.

It was discovered that by forming a sheet of chrysotile asbestos fibers having as a binder certain high molecular weight copolymers of butadiene, particularly certain butadiene-styrene copolymers, and subjecting such sheet to a particular heat treatment, there is obtained an insulating material having a significant degree of resiliency at relatively high temperatures on the order of 700° to 1,200°F. At these temperatures the sheet does not undergo degradation to any significant degree. Thus, the sheet is capable of being subjected to substantial vibratory forces without breaking down even at the above-stated substantially elevated temperatures.

By reason of such properties, it was found that the novel asbestos sheet was an effective heat insulating means in emission control devices for motor vehicle internal combustion engines. More specifically, when two or more layers of the thermal insulating material are used as the heat insulating means of an emission control device, commonly referred to in the automotive industry as a thermal reactor (described in detail hereinafter in connection with the drawings), although the inner layer which is in direct contact with the reaction chamber is degraded by reason of the very high temperatures, e.g., 1,600°–2,000°F., to which it is exposed, the outer layer or layers which are at somewhat lower temperatures, e.g., 700°–1,200°F., are not significantly degraded and retain their resiliency and structural integrity. Thus, the insulating material of this invention has solved the problem of insulating various types of emission control devices for internal combustion engines.

DETAILED DESCRIPTION OF THE INVENTION

The heat insulating material of this invention is composed of two essential materials namely, chrysotile asbestos fibers and certain types of elastomeric binder.

The chrysotile asbestos fibers preferably are relatively long fibers, such as those having the Standard Grade Designation 5R and longer, including "crude" fibers, as classified by the Quebec Standard Asbestos Testing Machine. Fibers having the Standard Grade Designation 3R or longer are particularly preferred where the initial sheet, prior to the heat treatment, is prepared on a compressed asbestos sheeter according to the method of U.S. Pat. No. 2,534,814. However, shorter fibers than 5R may be used where the initial sheet is formed on a fourdrinier machine according to the method of U.S. Pat. No. 2,636,213, described hereinafter. However, the initial sheet, before heat treatment, preferably is formed on a compressed asbestos sheeter.

Turning now to the binder, it should comprise an elastomeric material. The term "elastomeric" as used in this specification and appended claims, is to be given its art recognized meaning and refers to materials that possess mechanical properties similar to the special properties characteristic of natural rubber — high deformability, rapid recovery from deformation, good mechanical strength, etc. The elastomeric materials preferably employed as binders are high molecular weight copolymers of butadiene, such as butadiene-styrene and butadieneacrylonitrile copolymers, particularly the former. By "high molecular weight" is meant those butadiene copolymers having a molecular weight in the range between about 150,000 and 200,000. In the case of butadiene-styrene (SBR) copolymers, preferably they contain from about 20 to about 30 percent, by weight, of bound styrene. Particularly useful SBR copolymers contain on the order of 28–29 percent bound styrene.

As will be seen from the following discussion, the elastomeric binder ordinarily will be combined with the asbestos fibers in the form of a latex, regardless of whether the initial sheet is formed on a compressed asbestos sheeter or on a fourdrinier machine. Suitable latices generally will contain a relatively high solids content, e.g., 65–70 percent total solids. Such latices have an alkaline pH and contain a soap-type emulsifier or dispersing agent.

The relative proportions of asbestos and elastomeric binder may vary somewhat as shown by the following table:
-Continued

| Constituent | Percent by Weight |
| --- | --- |
| Elastomer solids | 10–20 |
| Asbestos fibers | 65–90 |
| Filler | 0–10 |

Preferably, the sheet comprises about 75 percent asbestos fibers, 15 percent elastomeric binder and 10 percent filler.

Suitable fillers include barium sulfate, calcium carbonate, zinc oxide, magnesium oxide and the like. The filler particles preferably are –200 mesh. The sheet may also contain the usual curing agents, curing agent accelerators, etc. Preferably, the sheet does not contain any curing agent.

As stated above, the asbestos fibers and elastomeric binder may be combined to form a sheet by means of the method of U.S. Pat. No. 2,534,814. According to that patent, the asbestos fibers are first coated with a rubber solvent, such as gasoline, mineral spirits, petroleum naphtha, etc., in suitable mixing apparatus, such as a kneader. Thereafter, the latex and filler, curing agents, etc., if any, are added to the kneader. The resulting mix, which should be of "sheeter consistency," is fed to the nip of the rolls of a compressed asbestos sheeter. Such apparatus, which is generally similar to a rubber mill, has rolls of two different diameters which run at even speeds. The larger roll, which is the bulid-up roll, is heated to a temperature of 240° – 270°F. and the smaller roll is run cold. A tremendous pressure is applied by the cold roll which is continuously backed off during the build up operation to the desired sheet thickness. As the material builds up, solvent is evaporated.

On the sheeter the major portion of the asbestos fibers become aligned in a generally parallel relation extending circumferentially of the roll. In most instances on the order of 60-70 percent of the fibers will be so aligned. Such alignment of the fibers is important in providing the sheet with desirable physical properties.

The sheet produced on the sheeter will generally have a thickness in the range between about 1/64 in. and 1/16 in. depending upon the particular use for which the sheet is designed. The sheet from the sheeter should have a density of about 1.00 oz./cu.in. (±0.03 oz.). If the desnity is too low, the sheet may have undesirable holes.

In an alternative embodiment of this invention, the initial asbestos sheet can be produced on a fourdrinier machine according to the method of U.S. Pat. No. 2,626,213. In such process a dispersion of asbestos fibers is prepared according to the patent, rubber latex is added thereto, and the composition is sheeted on a fourdrinier machine. Such machine also causes the asbestos fibers to be aligned predominantly in a single direction as described above. The proportions of fibers and latex employed should be such as to provide a sheet containing 65–90 percent fibers and 10–20 percent elastomeric binder.

Regardless of whether the initial sheet is formed on a compressed asbestos sheeter or on a fourdrinier machine, the sheet is subjected to the identical heat treatment. Broadly, the heat treatment comprises heating the sheet at a temperature of from about 525°F. to about 575°F., preferably about 550°F., for a period of time to cause a weight reduction in the sheet of from about 8 to about 10 percent, preferably about 9 percent. This heat treatment apparently drives off volatiles such as the latex soap, residual solvent, etc., and also causes some cracking of the elastomeric binder. In addition, some or all of the hygroscopic (uncombined) water of the asbestos fibers is volatilized.

The removal of such volatiles should be carried out so as to avoid any "shock" treatment, otherwise blister formation and degradation of the sheet will occur. Thus, the sheet should be slowly heated to the above-specified temperature range. A particularly preferred heat treatment comprises heating the sheet from ambient temperature to about 400°F. over a period of about one hour, maintaining the sheet at about 400°F. for several hours, e.g. 4 hours, cooling the sheet to ambient temperature, then heating the sheet to about 550°F. over a period of 1 hour, followed by maintaining the sheet at the latter temperature for several hours, e.g., 2-4 hours.

The above preferred heating schedule can be varied, and to some degree will depend upon sheet thickness, thicker sheets requiring longer heating times at the specified elevated temperatures.

After the heat treatment, the sheet should have the following physical properties:

| | |
|---|---|
| Density: | .87-.92 oz./cu.in. |
| Durometer "C" Scale Hardness | 86-90 |
| Compression at 5000 psi | 23-25% |
| Compression at 1000 psi | 18-20% |
| Tensile Strength with Grain* | 7800-8200 psi |
| Tensile Strength across Grain | 2800-3200 psi |
| k Factor | .09-.14 BTU-Ft/Ft$^2$-Hr-°F |

* Direction of major portion of fiber orientation.

As stated above, the novel asbestos sheet material of this invention is particularly useful as insulation in emission control devices for internal combustion engines. Referring to the drawings, 10 represents schematically an internal combustion engine, e.g., a gasoline engine. Attached to the engine by means of four cylinder exhaust ducts 12 is exhaust manifold 14 of cast iron or other suitable metal. Manifold 14 is composed of two elongated mating castings 16 and 18 held together by nut and bolt means 20. A gasket 22 to form an air-tight seal between castings 16 and 18$_x$ could be used.

Within the elongated recess of the manifold 14 is a generally tubular reaction chamber or can 24 of heat and corrosion resistant material, usually metal such as a nickel-chromium alloy. The reaction chamber is provided with four flanged exhaust gas intake ports 26 which are seated in accommodating recessed portions of casting 16 so as to connect with cylinder exhaust ducts 12. The reaction chamber also has a flanged exhaust duct 28 (FIG. 1) which connects with exhaust line 30 attached to manifold casting 18. The reaction chamber may contain baffles or the like, not shown.

Completely surrounding the reaction chamber or can 24 is insulation means 32 comprising three superimposed layers of the asbestos sheet material of the present invention. Each layer, for example, may be about 1/32 in. in thickness. In any event, the total thickness should be sufficient to maintain the temperature within the reaction chamber above about 1,600°F. while preventing the exterior surface of the manifold 14 from exceeding about 900°F. Preferably, the layers are not bonded together.

In operation, exhaust emissions from engine 10, along with an oxidizing gas, such as air, enters the reaction chamber 24 through exhaust ducts 12 and ports 26. In the reaction chamber unburned hydrocarbons and carbon monoxide are converted to carbon dioxide and water vapor. The non-polluting gases are then exhausted through exhaust pipe 30.

Figure 4:
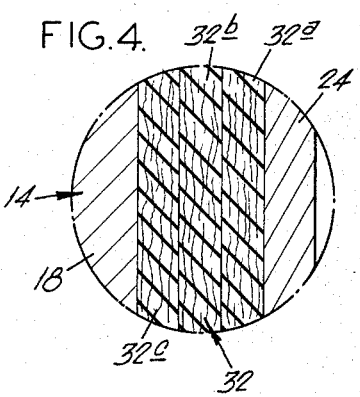
FIG. 4 is a greatly enlarged sectional view showing the details of that portion of the insulating means of the emission control device contained within the circle marked "FIG. 4" in FIG. 3.
Figure 2:
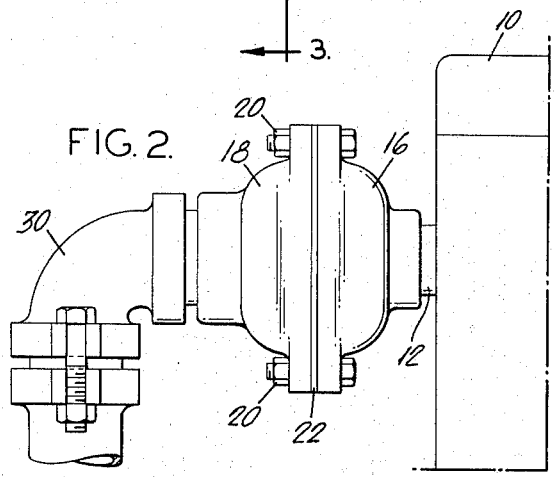
FIG. 2 is a fragmentary end elevation of FIG. 1 as viewed from the left.
Figure 3:
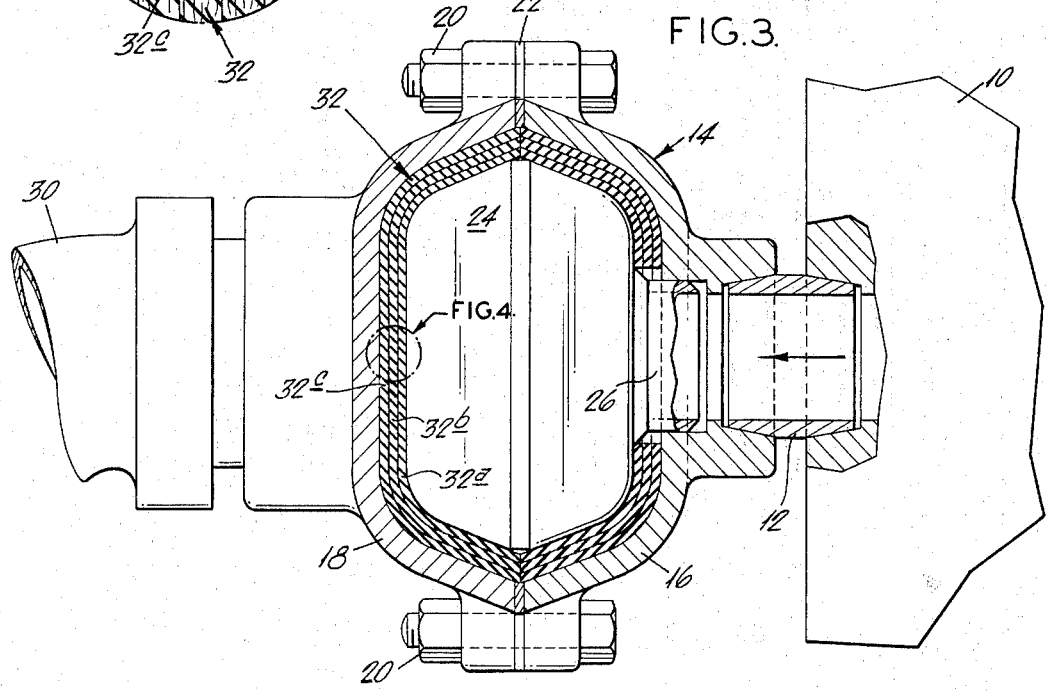
FIG. 3 is a transverse section of an emission control device of this invention taken along the line 3—3 of FIG. 1.

During operation, the innermost layer of insulating material (see 32a, FIG. 4) is degraded by contact with the reaction chamber which is at a temperature above 1,600°F. However, insulating layers 32b and 32c, particularly the latter which is heated to a temperature generally not exceeding 1,000°F., retain both insulating porperties and a sufficient degree of resiliency to provide the necessary temperature differential between the reaction chamber and the exterior of the manifold even though subjected to substantial vibratory forces. Based on tests to date with exhaust emission control devices of the general type shown in the drawings, it is anticipated that the asbestos sheet material of this invention will provide effective insulation for a period of engine operation in excess of 50,000 miles.

The novel asbestos sheet material, in addition to having utility as heat insulating means in emission control devices (thermal reactors, catalytic converters, etc.), can be employed to insulate engine air intake heaters and can be used to form carburetor spacer gaskets on internal combustion engines. The sheet material thus finds particular utility as heat insulation where such insulation is subjected to vibratory forces.

The following example is illustrative of the invention, and is not to be considered as in limitation thereof:

EXAMPLE I

In making the heat insulating material, the below-listed components were present in the amounts specified:

| Constituent | Parts by Weight |
|---|---|
| Butadiene-styrene copolymer latex solids* | 15 |
| Chrysotile asbestos fiber** | 75 |
| Barium sulfate | 10 |
| Petroleum naphtha solvent | 100 |

* The latex contained 68% solids, and the copolymer contained 28% bound styrene and had a molecular weight in the range of 150,000 to 200,000.
** Standard Grade Designation 3A and longer (Quebec Standard Asbestos Testing Machine).

The asbestos fibers and solvent were combined in a kneader, the amount of solvent being sufficient to thoroughly coat the fibers. The barium sulfate and latex were then added to the kneader and mixed with the fibers to provide a kneaded composition of sheeter consistency. The mix was fed to the nip of the rolls of a compressed asbestos sheeter. The larger hot roll of the sheeter was at a temperature of about 260°F., at which temperature the solvent was driven off. High pressure was applied by the cold roll which was continuously backed off during the build-up of the sheet on the hot roll. The final sheet had a thickness of about 1/32 inch and a density of 1.00 oz./cu.in. (±0.03 oz.) when removed from the hot roll.

The sheet was cut into several smaller size pieces, and the pieces were heated from ambient temperature to 400°F. over a period of 1 hour, at which temperature they were maintained for 4 hours. The sheets were then cooled to room temperature and reheated to 550°F. over a period of 1 hour, and then maintained at 500°F. for 4 hours.

As a result of this heat treatment, the sheets underwent a weight reduction of about 9 percent. The heat treated sheets had the following properties:

| | |
|---|---|
| Density: | 0.90 oz./cu.in. |
| Durometer "C" Scale Hardness: | 88 |
| Compression at 5000 psi: | 24.0% |
| Compression at 1000 psi: | 19.2% |
| Tensile Strength with Grain*: | 8020 psi |
| Tensile Strength across Grain: | 3052 psi |
| k Factor: | .11 BTU-Ft/Ft$^2$-Hr-°F. |

* Direction of major portion of fiber orientation.

Asbestos sheet material produced as in Example I was used as heat insulation means on an emission control device of the general type disclosed in the drawings. The sheet material provided the necessary heat insulating properties after 50,000 miles of operation of the motor vehicle in which the engine having the emission control device was installed.

The above-described separation of the superimposed layers of the heat insulating material can be enhanced by coating the surfaces of the material with a layer of inorganic material. An effective coating can be obtained by use of the lithium polysilicate solution disclosed in U.S. Pat. No. 2,668,142. In addition, the heat insulating properties of the asbestos sheet material of this invention can be somewhat enhanced by including up to about 15 percent of such lithium polysilicate in the sheet per se.

What is claimed is:

1. The method of making a heat insulating material which comprises forming a sheet comprising from about 75 to about 90 percent by weight of chrysotile asbestos fibers, from about 10 to about 20 percent of an elastomeric binder comprising a copolymer of butadiene having a molecular weight of from about 150,000 to about 200,000, and from about 0 to about 10 percent of filler, the major portion of said asbestos fibers being oriented in a generally parallel relation with respect to each other within said sheet, and heat treating said sheet at a temperature of from about 525° to about 575°F. for a period of time to cause a weight reduction in said sheet of from about 8 to about 10 percent and to effect cracking of said elastomeric binder.

2. The method according to claim 1 wherein said asbestos fibers range in size from 5R to crude, and said elastomeric binder comprises a copolymer of butadiene and styrene.

3. The method according to claim 2 wherein said heat treatment comprises slowly heating said sheet to about 400°F., maintaining said sheet at said temperature for a period of several hours, cooling said sheet to ambient temperature, slowly heating said sheet to about 550°F., and maintaining said sheet at said latter temperature for a period of several hours.

4. An asbestos sheet comprising from about 75 to about 90 percent by weight of chrysotile asbestos fibers, from about 10 to about 20 percent of an elastomeric binder comprising a copolymer of butadiene having a molecular weight of from about 150,000 to about 200,000 and from about 0 to about 10 percent of filler, the major portion of said asbestos fibers being oriented in a generally parallel relation with each other within said sheet, said sheet having been heat treated at a temperature of from about 525° to about 575° F., for a period of time to cause a weight reduction in said sheet of from about 8 to about 10 percent and to effect cracking of said elastomeric binder.

5. An asbestos sheet according to claim 4 wherein said asbestos fibers range in size from 5R to crude, and said elastomeric binder comprises a copolymer of butadiene and styrene.

6. An asbestos sheet according to claim 5 wherein said heat treatment comprises slowly heating said sheet to about 400°F., maintaining said sheet at said temperature for a period of several hours, cooling said sheet to ambient temperature, slowly heating said sheet to about 550°F., and maintaining said sheet at said latter temperature for a period of several hours.

* * * * *